(12) United States Patent
Weiss

(10) Patent No.: US 8,346,654 B2
(45) Date of Patent: Jan. 1, 2013

(54) INDEXED PAYMENT STREAM SYSTEM AND METHOD

(75) Inventor: Allan N. Weiss, Medfield, MA (US)

(73) Assignee: Market Shield Capital, LLC, Natick, MA (US)

(*) Notice: Subject to any disclaimer, the term of this patent is extended or adjusted under 35 U.S.C. 154(b) by 175 days.

(21) Appl. No.: 12/688,415

(22) Filed: Jan. 15, 2010

(65) Prior Publication Data

US 2010/0121758 A1    May 13, 2010

Related U.S. Application Data

(63) Continuation-in-part of application No. 11/553,150, filed on Oct. 26, 2006, now Pat. No. 7,716,106, which is a continuation of application No. 10/794,465, filed on Mar. 5, 2004, now Pat. No. 7,155,468.

(60) Provisional application No. 61/144,935, filed on Jan. 15, 2009, provisional application No. 60/453,075, filed on Mar. 7, 2003.

(51) Int. Cl.
*G06Q 40/00* (2012.01)
(52) U.S. Cl. ......................................................... 705/37
(58) Field of Classification Search ............... 705/35, 705/37
See application file for complete search history.

(56) References Cited

U.S. PATENT DOCUMENTS

| 4,346,442 A | 8/1982 | Musmanno |
|---|---|---|
| 4,376,978 A | 3/1983 | Musmanno |
| 4,597,046 A | 6/1986 | Musmanno et al. |
| 4,674,044 A | 6/1987 | Kalmus et al. |
| 4,700,297 A | 10/1987 | Hagel, Sr. et al. |
| 4,774,663 A | 9/1988 | Musmanno et al. |
| 4,953,085 A | 8/1990 | Atkins |
| 5,083,782 A | 1/1992 | Nilssen |
| 5,126,936 A | 6/1992 | Champion et al. |
| 5,270,922 A | 12/1993 | Higgins |
| 5,297,032 A | 3/1994 | Trojan et al. |
| 5,671,363 A | 9/1997 | Cristofich et al. |
| 5,745,885 A | 4/1998 | Mottola et al. |
| 5,765,144 A | 6/1998 | Larche et al. |
| 5,781,654 A | 7/1998 | Carney |

(Continued)

FOREIGN PATENT DOCUMENTS

JP    2002007691    1/2002

(Continued)

OTHER PUBLICATIONS

Bid.Com Receives CDN$3.1 Million From Acqua Wellington Private Placement PR Newsire. New York: Jun. 20, 2000. p. 1.

(Continued)

*Primary Examiner* — Eric T Wong
(74) *Attorney, Agent, or Firm* — Onello & Mello, LLP

(57) ABSTRACT

Provided is a computer-implemented method for providing a common index securities fund that provides liquidity in a plurality of small business borrowers in a defined class. The method comprises providing a pool of cash from a lender to the fund; generating loans from the fund to borrowers; depositing the loans in interest-bearing accounts; providing interest from the interest bearing accounts to the lender and the borrowers; and, upon withdrawal of the loans from the interest-bearing accounts, repaying the loans to the lender and commencing a payment stream by each borrower to the fund, including adjusting one or more payments in the payment stream using an index having a value relationship to the class.

29 Claims, 11 Drawing Sheets

U.S. PATENT DOCUMENTS

| | | | |
|---|---|---|---|
| 5,802,501 | A | 9/1998 | Graff |
| 5,806,048 | A | 9/1998 | Kiron et al. |
| 5,809,484 | A | 9/1998 | Mottola |
| 5,812,988 | A | 9/1998 | Sandretto |
| 5,819,238 | A | 10/1998 | Fernholz |
| 5,826,243 | A | 10/1998 | Musmanno et al. |
| 5,890,141 | A | 3/1999 | Carney et al. |
| 5,950,175 | A | 9/1999 | Austin |
| 5,963,923 | A | 10/1999 | Garber |
| 5,987,435 | A | 11/1999 | Weiss et al. |
| 6,070,151 | A | 5/2000 | Frankel |
| 6,195,647 | B1 | 2/2001 | Martyn et al. |
| 6,249,775 | B1 | 6/2001 | Freeman et al. |
| 6,513,020 | B1 | 1/2003 | Weiss et al. |
| 7,599,886 | B1* | 10/2009 | Lambert .......... 705/39 |
| 2002/0082903 | A1 | 6/2002 | Yasuzawa |
| 2002/0091623 | A1 | 7/2002 | Daniels |
| 2002/0178111 | A1 | 11/2002 | Woodley |
| 2003/0110122 | A1* | 6/2003 | Nalebuff et al. .......... 705/38 |
| 2004/0054613 | A1 | 3/2004 | Dokken |
| 2004/0254871 | A1 | 12/2004 | Weiss |
| 2005/0216384 | A1 | 9/2005 | Partlow et al. |
| 2010/0169205 | A1* | 7/2010 | Labuszewski et al. .......... 705/37 |

FOREIGN PATENT DOCUMENTS

| | | |
|---|---|---|
| WO | 95/06290 | 3/1995 |
| WO | 98/13778 | 4/1998 |
| WO | 2004/013793 | 2/2004 |

OTHER PUBLICATIONS

Shiller, R. J., et al., "Home Equity Insurance", National Bureau of Economic Research, Inc., Working Paper Series, Working Paper No. 4830 (Aug. 1994).

Shiller, R.J., "Macro Markets: Creating Institutions for Managing Society's Largest Economic Risks", Oxford University Press, Oxford (Clarendon Press 1993).

Case, K.E., et al., "Index-Based Futures and Options Markets in Real Estate", The Journal of Portfolio Management, pp. 83-92 (Winter 1993).

"The SuperTrust Trust for Capital Market Fund, Inc. Shares, et al; Notice of Application", 46 SEC-Docket 1170, Release No. IC-17613 (Jul. 25, 1990).

Kelleher, N., "The Small Business Page Cash-for-Settlement Industry: A new Idea Turns Structured Deals into Ready $$", Boston Herald, Boston, MA, Mar. 11, 1997, pp. 019).

Shiller, Robert J., "The New Financial Order: Risk in the 21st Century", Princeton University Press, 2003.

Shiller, Robert J., et al., "Moral Hazard in Home Equity Conversion", Jan. 4, 1998, pp. 1-29.

* cited by examiner

| Loan Assistance Example Scenario | | | | | | | |
|---|---|---|---|---|---|---|---|
| | | | | | Net for | Net for | Additional |
| Year | Annual Rental Index Inflation | FDIC Insured Bank Account | Savings Interest Rate (may change) | Bank Interest Earned, Monthly | Interest paid to Fund (45%) | Borrower Monthly Bills (55%) | Borrower Annual Bills (55%) | Interest on Loan = 1 x *Rent Inflation |
| *2009 | 2.2% | $ 250,000 | 4.0% | $ 833 | $ 375 | $ 458 | $ 5,496 | 5,500 |
| 2010 | 2.0% | $ 250,000 | 4.0% | $ 833 | $ 375 | $ 458 | $ 5,496 | 5,110 |
| 2011 | 2.0% | $ 250,000 | 4.0% | $ 833 | $ 375 | $ 458 | $ 5,496 | 5,212 |
| 2012 | 2.0% | $ 250,000 | 4.0% | $ 833 | $ 375 | $ 458 | $ 5,496 | 5,316 |
| 2013 | 2.0% | $ 250,000 | 4.0% | $ 833 | $ 375 | $ 458 | $ 5,496 | 5,423 |
| 2014 | 2.0% | $ 250,000 | 4.0% | $ 833 | $ 375 | $ 458 | $ 5,496 | 5,531 |
| 2015 | 2.0% | $ 250,000 | 4.0% | $ 833 | $ 375 | $ 458 | $ 5,496 | 5,642 |
| 2016 | 2.0% | $ 250,000 | 4.0% | $ 833 | $ 375 | $ 458 | $ 5,496 | 5,755 |

Bank deposit is collateral for Loan

Phase II

Bank interest earned monthly: 45% to Fund and 55% toward borrower monthly bills

Interest owed to Fund of 1 x Rent Inflation accumulates during Phase II

*FIG. 8*

If loan cancelled by either side – PHASE III
Use bank balance to pay down loan

| Year of cancelation | Balance | 5 Years of Monthly Payments | Inflation multiple | *Example Rent Inflation | Example Interest |
|---|---|---|---|---|---|
| 1 | 5,500 | $106 | | 3 | 6% |
| 2 | 10,610 | $205 | | 3 2% | 6% |
| 3 | 15,822 | $306 | | 3 2% | 6% |
| 4 | 21,139 | $409 | | 3 2% | 6% |
| 5 | 26,561 | $514 | | 3 2% | 6% |
| 6 | 32,093 | $620 | | 3 2% | 6% |
| 7 | 37,734 | $730 | | 3 2% | 6% |
| 8 | 43,489 | $841 | | 3 2% | 6% |

*Previous year inflation for Metro Boston Rent of Primary Residence
as published by US Gov Beareau of Labor Statistics www.bls.gov

*FIG. 9*

| Fund | Boston Metro 2010 |
|---|---|
| Acct No. | 2010-001 |
| Name | Joe Smith |
| Lender | Merrill Lynch |
| Principal | $250,000 |
| Loan Term | 10 years |
| Start Date | 01/15/2010 |
| End Date | 1/15/2020 |
| Bank | Citibank |
| Accumulated Interest | $___ |
| Payment Term | 5 years |
| Monthly Payment | $___ |
| Start Date | 1/15/2020 |
| End Date | 1/15/2025 |

*FIG. 11*

INDEXED PAYMENT STREAM SYSTEM AND METHOD

CROSS REFERENCES TO RELATED APPLICATIONS

This application claims the benefit of priority under 35 U.S.C. §119(e) from commonly owned U.S. provisional patent application Ser. No. 61/144,935, entitled INDEXED PAYMENT STREAM SYSTEM AND METHOD, filed Jan. 15, 2009; this application is a continuation-in-part of co-pending, commonly owned U.S. non-provisional patent application Ser. No. 11/553,150, entitled COMMON INDEX SECURITIES, filed Oct. 26, 2006, which is a continuation application of U.S. patent application Ser. No. 10/794,465, filed Mar. 5, 2004, entitled COMMON INDEX SECURITIES, now U.S. Pat. No. 7,155,468, which claimed priority under 35 U.S.C. §119(e) to U.S. Provisional Patent Application Ser. No. 60/453,075, entitled SMALL BUSINESS LIQUID SECURITIES, filed Mar. 7, 2003, each of which is hereby incorporated by reference.

FIELD OF INTEREST

The present inventive concepts generally relate to systems and methods for electronically processing and transforming information in the field of finance, and particularly to systems useful for providing liquidity to one or more entities in exchange for one or more payments by the one or more entities that are indexed to the fortunes of the one or more entities or a class to which the one or more entities belong.

BACKGROUND

Presently, there are very limited approaches for providing upfront liquidity (e.g., cash) to a borrower in exchange for a subsequent payment stream obligation. Typical approaches include loans that have fixed or variable rate interest ultimately related to other floating interest rates, such as LIBOR (London Inter-Bank Offer Rate), which is the rate banks usually charge each other for loans.

Using these approaches, a borrower receives liquidity in the form of a loan and commits to repaying the loan based on the interest rate. Since the interest rate, whether fixed or variable, has little or no relationship to the borrowers' fortunes, there is an inherent and unaccounted for risk that changes in the borrower's fortunes will lead to default, where the principal will never be completely repaid. This risk is particularly high when the borrower belongs to a class of borrowers in jeopardy of adverse economic changes, whether short or long term. Of course, this is a risk to the borrower as well. Therefore, a major component of this risk is the fact that the borrower's payment obligation is not particularly related to the fortunes of the borrower, e.g., the borrower's ability to generate revenue or income.

As has been shown by recent financial crises, general economic downturns can increase the strain on borrowers, and ultimately lead to defaults. Borrowers and lenders may each be relatively unprotected in such situations—using typical lending approaches. Borrowers gradually see their cash holdings and incomes decline with no systematic adjustments responsive to the new economic circumstances.

Systems and methods that enable borrowers to obtain liquidity with minimal risk to lenders, as well as diminished risk to borrowers, could provide substantial advantages over typical approaches to providing liquidity.

SUMMARY

In accordance with one aspect of the present disclosure, provided is a computer-implemented method for providing a common index securities fund that provides liquidity in a plurality of small business borrowers in a defined class. The method comprises providing a pool of cash from a lender to the fund; generating loans from the fund to borrowers; depositing the loans in interest-bearing accounts; providing interest from the interest bearing accounts to the lender and the borrowers; and, upon withdrawal of the loans from the interest bearing account, repaying the loans to the lender and commencing a set of one or more payments by each borrower to the fund, related to an index having a value relationship to the class.

The method can include defining shares as claims against the fund.

The method can include offering at least some of the shares for trading via an exchange managed by a trading system.

The borrowers can be individual home owners and the index can be residential rental rates.

The interest-bearing accounts can be backed by a surety.

The method can include paying some interest from the interest-bearing account(s) to the fund.

The fund can be managed by a fund processor configured to store and manage financial information for the fund, including adjusting payment streams in response to changes in the index.

The fund processor can also process payments from borrowers.

The fund processor can also adjust or track the value of fund shares.

In accordance with another aspect of the present invention, provided is a computer-implemented method for providing a fund that provides liquidity in a plurality of borrowers in a defined class. The method includes providing a computer system having a computer processor coupled to a data storage device, the computer system configured to exchange data with external systems via a computer network. The method also includes, in the data storage device, defining a fund identification (ID) and a cash value representing a fund pool of cash from at least one lender; generating a loan from the fund pool of cash to a borrower from the plurality of borrowers, including storing in the data storage device a loan principal and loan term in association with the borrower; depositing the loan principal in an interest-bearing account and electronically calculating interest; for a time period not greater than the loan term, electronically proportioning the interest and distributing a first interest portion to a lender account and a second interest portion to a borrower account; electronically calculating an accumulated interest amount for the loan for the time period based on the loan principal; and calculating a payment stream for the borrower from the accumulated interest amount and from an index that represents value-based performance of the class.

The method can further include processing a borrower payment from the payment stream by transforming digital accumulated interest payment information into an electronic payment value and reducing the accumulated interest amount by the payment value.

The method can further include calculating the accumulated interest amount using the index.

The class can include or be residential real estate and the plurality of borrowers can be or include individual home owners.

In such a case, the index includes a component representing residential rental rates.

The method can further include electronically generating the index from data received via the network from at least one external source.

The index can be an effective index that is a multiple of a base index, wherein the multiple is greater than 1.

The method can further include electronically issuing shares as claims against the fund.

The method can further include offering at least some of the shares for trading via an exchange managed by a trading system.

The method can further include electronically distributing a third portion of the interest to a fund account.

In accordance with another aspect of the present invention, provided is a fund management system configured to provide liquidity in a plurality of borrowers in a defined class. The system includes at least one computer processor coupled to at least one data storage device, and is configured to exchange data with external systems via a computer network. The computer system further comprises: a fund manager adapted to store a fund identification (ID) and a cash value representing a fund pool of cash from at least one lender; an account manager adapted to generate a loan from the fund pool of cash to a borrower from the plurality of borrowers, wherein the account manager stores a loan principal and loan term in association with the borrower; the fund manager is also adapted to determine interest of an interest-bearing account into which the loan principal has been deposited; the fund manager is also adapted to determine a proportioning of the interest, wherein, for a time period not greater than the loan term, a first interest portion is distributed to a lender account and a second interest portion is distributed to a borrower account; an interest accumulator adapted to electronically calculate an accumulated interest amount for the loan for the time period based on the loan principal; and a payment adjuster adapted to calculate a payment stream for the borrower from the accumulated interest amount and from an index that represents value-based performance of the class.

The payment adjuster can also be adapted to process a borrower payment from the payment stream by transforming digital accumulated interest payment information into an electronic payment value and reducing the accumulated interest amount by the payment value.

The interest accumulator can also be adapted to calculate the accumulated interest amount using the index.

The class can include residential real estate and the plurality of borrowers can include individual home owners.

In such a case, the index can include a component representing residential rental rates.

The system can further comprise an index monitor adapted to electronically generate the index from data received via the network from at least one external source.

The index monitor can also be adapted to generate the index as an effective index that is a multiple of a base index, wherein the multiple is greater than 1.

The system can further comprise a trading module adapted to electronically issue shares as claims against the fund.

The trade module can also be configured to electronically communicate with a trading system that offers at least some of the shares for trading via an exchange.

The fund manager can also be adapted to determine a third portion of the interest and to electronically distribute the third portion of the interest to a fund account.

In accordance with another aspect of the present invention, provided is a computer-implemented method for providing a fund that provides liquidity in a plurality of borrowers in a defined class. The method comprises providing a computer system having a computer processor coupled to at least one data storage device, the computer system configured to exchange data with external systems via a computer network. The method also comprises, using the computer system: defining a fund having a cash value representing a fund pool of cash from at least one lender; generating a loan from the fund pool of cash to a borrower from the plurality of borrowers, including defining a loan principal; depositing the loan principal in an interest-bearing account; proportioning interest from the interest-bearing account into a first interest portion for a lender and a second interest portion for the borrower; calculating an accumulated interest amount for the loan based on the loan principal and a duration of the loan; and calculating a payment stream for the borrower from the accumulated interest amount and from an index that represents value-based performance of the class.

The method can further include calculating the accumulated interest amount using the index.

The class can include residential real estate and the plurality of borrowers can include individual home owners.

In such a case, the index includes a component representing residential rental rates.

The method can further include electronically generating the index from data received via the network from at least one external source.

The index can be an effective index that is a multiple of a base index, wherein the multiple is greater than 1.

The method can further include issuing shares as claims against the fund.

The method can further include offering at least some of the shares for electronic trading via an exchange managed by a trading system.

The method can further include electronically distributing a third portion of the interest to a fund account.

BRIEF DESCRIPTION OF THE DRAWINGS

The present invention will become more apparent in view of the attached drawings and accompanying detailed description. The embodiments depicted therein are provided by way of example, not by way of limitation, wherein like reference numerals refer to the same or similar elements. The drawings are not necessarily to scale, emphasis instead being placed upon illustrating aspects of the invention. In the drawings:

FIGS. 5-9 show a more detailed example embodiment of the network of systems of FIG. 4.

FIG. 11 provides an example of information that can be included in an account definition for a Borrower, and electronically stored.

DETAILED DESCRIPTION OF PREFERRED EMBODIMENTS

Figure 1:
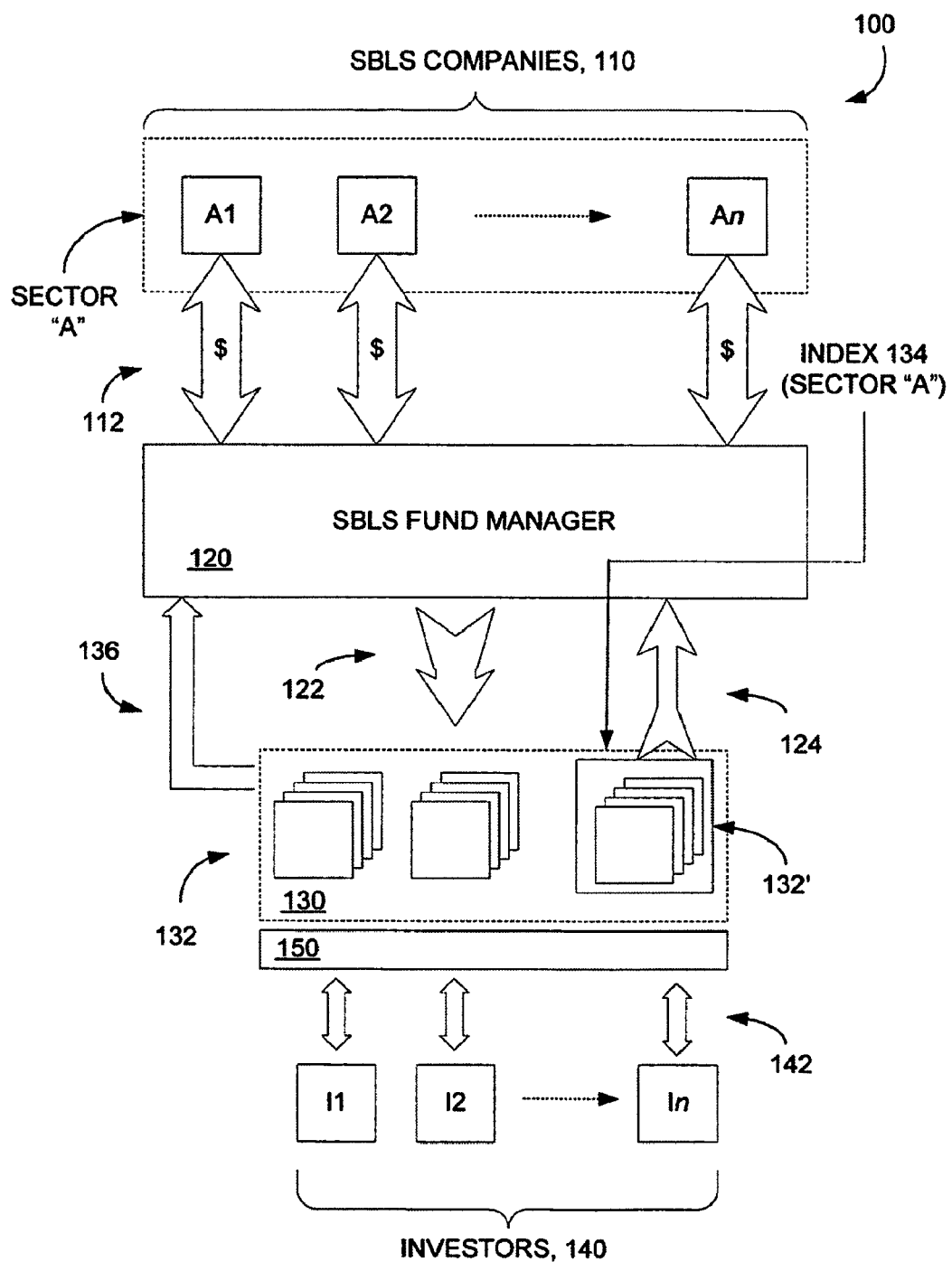
FIG. 1 is a block diagram of an embodiment of a common index securities system in accordance with the present invention.

Hereinafter, aspects of the present invention will be described by explaining illustrative embodiments in accordance therewith, with reference to the attached drawings. While describing these embodiments, detailed descriptions of well-known items, functions, or configurations are typically omitted for conciseness.

It will be understood that, although the terms first, second, etc. are be used herein to describe various elements, these elements should not be limited by these terms. These terms are used to distinguish one element from another, but not to imply a required sequence of elements. For example, a first element can be termed a second element, and, similarly, a second element can be termed a first element, without departing from the scope of the present invention. As used herein, the term "and/or" includes any and all combinations of one or more of the associated listed items.

It will be understood that when an element is referred to as being "on" or "connected" or "coupled" to another element, it can be directly on or connected or coupled to the other element or intervening elements can be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements, and/or components, but do not preclude the presence or addition of one or more other features, steps, operations, elements, components, and/or groups thereof.

A common index fund system and method are provided, which include or use a network of specially configured computing devices. The common index securities system and method could be implemented as a small business liquid security (SBLS) system and method that enables investment in one or more "small businesses" (or entities) relatively easily. An SBLS system in accordance with this embodiment can enable the creation, issuance, trading and management of SBLS shares as an ordinary liquid equity investment tradable on a stock exchange, like shares of any publicly traded company. Since an SBLS fund is a form of a common index fund, payments made be each small business to the fund (and any other entity represented in the fund) are indexed to at least one index representing or related to the value, performance, revenues, and/or profits of the small businesses (or assets held by the small business). An industry-wide performance index is one example of such an index. A local or regional industry-based index is another example. The index can be any of a variety of indexes, so long as it is related to or representative of the fortunes of the small businesses. SBLS shares may be traded publicly, privately or some combination thereof, or not at all.

Entities that participate in the fund can include small businesses, where a "small business" may a business defined by certain agencies or governmental regulations as a "small business" based on criteria relating to the size of the business, such as its number of employees, gross revenue, and so on. The phrase "small business" as used herein can also include other businesses or entities not traded or traditionally tradable as a liquid security, such as: (1) any entity that is generally considered by the financial community as not suitable for an initial public offering (IPO) or public trading, (2) any entity that was once publicly traded, but has since been delisted, (3) a subsidiary, affiliate of a business, even if that business is traded publicly or privately or (4) any other entity not publicly traded, regardless of size, or profitability, (5) a source of income flowing from one or more individuals or entities, (6) a partnership or joint venture, (7) a university or not-for-profit organization, (8) an individual or group of individuals, and/or (9) the owner/holder of assets having a market value, or (10) any combination of the foregoing. As examples, a start-up company, educational institution, not for profit or charitable institution, or individual (e.g., a home owner or other property owner) or group of individuals may each be a "small business" within the context of the present invention. A fund in accordance with the present invention may represent any of the foregoing, and can also include one or more businesses having stock that is publicly traded, or tradable (i.e., not "small businesses").

The fund can be formed as any type of traditional fund, or can take other forms, such as a bank or other entity with an available pool of cash. The fund can represent entities from one or more defined classes. The classes could be industry based, such as a defined class for oil companies, hotels, apartment buildings, commercial real estate, as just a few examples, or residential property or home owners as other examples. As another example, a class can represent a certain sector, or a limited number of sectors, of an industry, e.g., Class A office space in downtown Boston, Mass. And changes in an index associated with the fund could represent, in whole or in part, market values, performance, and/or earnings, profits, or revenues, associated with that industry sector or sectors, or industries or sectors that are related thereto.

FIG. 1 shows a block diagram of a representative common index securities system in accordance with aspects of the present invention. In this embodiment, the common index securities system is an SBLS system 100—meaning at least one entity represented by the fund is a small business, as that phrase is used herein. As will be appreciated by those skilled in the art, embodiments of system 100 could be implemented to include other than small business in combination with at least one small business, as an example. It will also be appreciated by those skilled in the computer arts and investment arts, that the present invention is not limited to the explicit structure of FIG. 1.

A fund 130 may specialize in a particular industry sector or sub-sector (collectively "Sector") or borrower type, shown as Sector A in FIG. 1, as a predefined class. The Sector may be narrowed by having a sub-sector focus, such as a geographical focus based on a country, region, or several countries. The SBLS fund 130 may be created and managed, as shown by arrow 122, by a fund manager 120 (or fund management system). The fund manager can issue shares 132 against the SBLS fund 130. Shares 132 can be offered publicly, e.g., on an exchange 150, offered privately, or not offered at all. That is, the shares 132 need not ever be offered for trade or listed on an exchange.

The SBLS fund manager 120 could form relationships with one or more businesses or companies 110 (e.g., businesses A1, A2, . . . An) in at least one class or sector of interest, e.g. Sector A, to form SBLS fund 130, including at least one small business. The SBLS fund manager 120 could reach individual business owners through alliances with commercial banks, brokerage firms, leasing companies, franchise companies or other sources of commercial loans. Such distribution, networking and solicitation may be accomplished electronically via the SBLS computer architecture 300 shown in FIG. 3, by more traditional means or by some combination thereof.

The fund manager 120 provides upfront liquidity to each business in the form of cash, marketable securities, or both, as indicated by arrow 112. Additionally, or alternatively, one or more business could receive shares in the SBLS fund, which may later become liquid and/or begin paying distributions. Such businesses 110 could receive SBLS shares 132, whether marketable or not, received by the fund manager 120 via arrow 136. The fund manager 120 may also obtain shares 132' for itself, as indicated by arrow 124. The subset of shares 132' is determined by allocating a number of shares to a company (e.g., A1) based on that company's buy-in and then applying left over amounts from the buy-in to purchase shares 132' for the fund manager 120.

In return for the upfront liquidity provided by the SBLS fund 130 to the companies 110 via arrow 112, the SBLS fund 130 receives subsequent payments from the businesses 110. The subsequent payments may take the form of an ongoing payment stream or a limited number of payments from the businesses, also indicated by arrows 112. At least one payment, or payment obligation, in the payment stream owed by each business is subject to change according to changes in an index 134 corresponding to the class (or industry sector).

In the preferred form, the payment stream owed by each business A1, A2, . . . An 110 would decline in negative economic circumstances and rise in positive economic circumstances—because the index 134 would decline in negative circumstance and rise in positive economic circumstances. But there may be embodiments where a reciprocal relationship can be implemented. In some embodiments a lower cap, an upper cap, or both could be applied to the payment stream.

Since the businesses 110 can receive shares 132 of the SBLS fund 130, a business A1 can also be an investor, e.g., investor I1. If the SBLS shares 132 are traded, then others can also invest. Regardless, SBLS fund investors 140 (e.g., investors I1, I2, . . . In) receive earnings that change in proportion to changes in the index 134, because each entity's payments are tied to the index. As mentioned above, index 134 may be an index for the overall industry sector or sectors comprising the businesses 110. Because the fund's performance is indexed to the industry, rather than the individual businesses' performance, the investors are not exposed to individual business mismanagement, fraud or other idiosyncratic risk, aside from outright bankruptcy, of individual businesses in the SBLS fund 130. Accordingly, the value of the fund, and that of the fund's shares, and any dividends paid out, are not relative to any individual business' earnings, revenues, expenses, cash flow or other performance or condition measure. To mitigate bankruptcy risk, for example, a guarantor (not shown) may be included in the system of FIG. 1 (or FIG. 2) to back-up the obligations of the companies 110 represented by the fund.

In the small business embodiment, the small business owner can "go public" with a portion of its shares and receive close to a publicly traded level of price to earnings (PE) ratios, while the party that issues the SBLS shares 132 can also realize a profit from the remaining portion of the arbitrage between private business PE ratios and those for publicly traded companies, as explained in greater detail below. Even when there are no small businesses represented by the fund, the same benefits are available to other types of entities and may be preferred to going public—even if available to such an entity. Of course, an entity could be publicly traded, and also be represented in a common index fund.

The value of the fund, thus the value of the fund shares, is based on the payments made to the fund by the companies represented in the fund, which is a function of the index. The index 134 may be a published index for the industry sector, if such an index exists, or it could be an index derived from one or more of other relevant parameters, for example: (1) the performance of a set of companies that is representative of the businesses in the fund or an industry associated with the fund, (2) one or more composite indices, (3) performance information related to companies within the fund (e.g., earnings, debt) or the sector or sectors, (4) generally available economic or financial indicators or rates (e.g., LIBOR, prime interest rate, unemployment, commodity prices, or cost of living), or (5) information of tangential or complimentary activity. In short, there is no particular constraint placed on the one or more indices used, other than they provide some meaningful value relationship to the fund or businesses represented by the fund. Among other things, the index or indices used may be geographically, regionally, politically or nationally oriented.

As will happen from time-to-time, a business, e.g., business A2, may be acquired. In such a case, and if the fund is structured to permit it, the rights and obligations of acquired business A2 can transfer to the new owner of the business A2. Subsequently, A2 (and its new owner) could be released from the fund if it resolves its payment stream obligations. It could also sell back its shares, or continue to hold them. Such provisions are preferably established at fund formation. Otherwise, such an acquisition could force a mandatory elimination or buy-out of A2 from the SBLS fund, which could carry a penalty. During the term a business may wish to pull-out of the fund for other reasons (e.g., to go public on its own). A similar buy-out may be allowed in such cases.

Some benefits of the single industry SBLS fund 130 approach shown in FIG. 1 can include:

1) Each SBLS fund 130 can specialize in one industry sector or sub-sector so investors and analysts can understand and choose investments they like.
2) The SBLS fund 130 takes only industry risk, not idiosyncratic business risk of any individual business in the fund (except, potentially, bankruptcy risk).
3) There are no fraud or management accountability issues regarding the individual businesses in the SBLS fund 130 or, at the very least, they are diluted enough to make them non-factors relative to investing in one business.
4) The individual business owner diversifies away some of his business risk.
5) The individual business owner retains the incentive to run his business for maximum profit because he keeps the entire amount that his profit growth exceeds that of the index.
6) The obligations of the individual business to pay an amount indexed to the performance of it its industry should be acceptable because the small business owner would presume that such obligation will track the individual businesses performance to a large degree.

Figure 2:
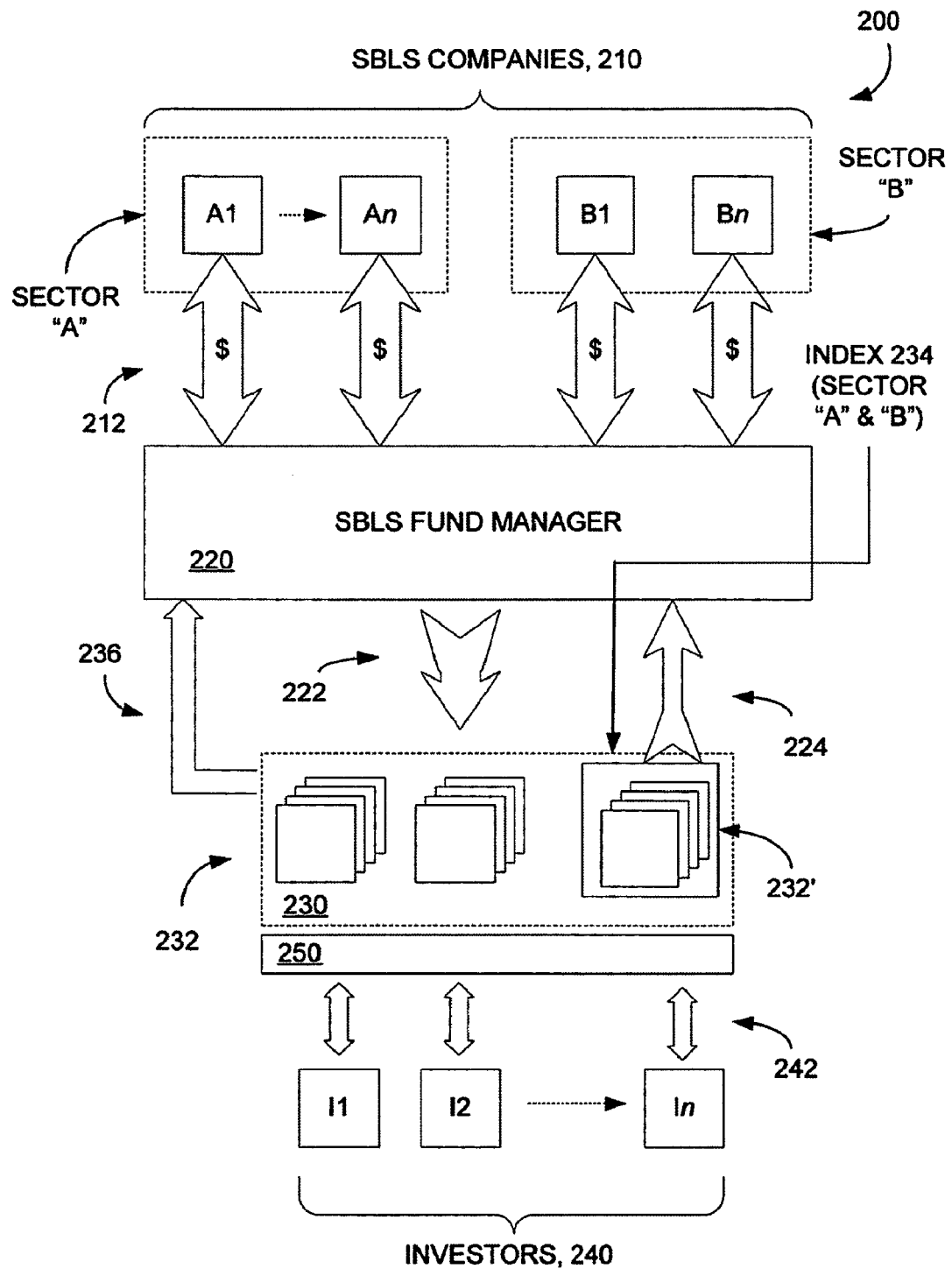
FIG. 2 is a block diagram of an alternate embodiment of a common index securities system, in accordance with the present invention.

In some forms, more than one industry or class may be represented in a SBLS fund, as is shown in FIG. 2. As an example, an SBLS fund 230 could represent two industry sectors A and B having significantly different volatility. In such a case, the SBLS fund 230 would not only be a composite of several companies 210, but also of several sectors or classes, offering to investors 240 a risk/reward opportunity that is a hybrid of the two. The risk/reward could be weighted according to the representation of each sector in the SBLS fund 230. For some investors, this hybrid SBLS fund 230 could provide a more attractive risk/reward than any one industry represented in the SBLS fund could offer by itself.

Otherwise, the SBLS fund 230 functions similar that of the SBLS fund 130 of FIG. 1. That is, SBLS shares 232 are issued against the SBLS fund 230 by the SBLS fund manager 220 (or management system). Because the payments made by the companies in the fund are tied to an index, the value the fund and the SBLS shares 232, and thus any related payouts to investor share holders 240, fluctuates in response to index 234. Index 234 may comprise one or more indices derived from or related to Sectors A and B. The payouts could also be made as a function of a blend of the index 234 and profits of the businesses, or other applicable or predetermined revenue sources or parameters.

The companies 210 from these sectors buy-in and receive upfront liquid assets, such as cash, marketable securities or both, indicated by arrows 212. The businesses could receive SBLS shares 232 via fund manager 220, also indicated by arrow 212, which need not necessarily be liquid. The fund manager 220 may obtain these SBLS shares 232 from the SBLS fund 230 as indicated by arrow 236. In exchange for the upfront liquidity or other assets, the businesses 210 agree to make subsequent payments to the fund, e.g., regular payments based on earnings. The amount of the payments is preferably adjusted according to index 234, which may be any type of index described herein, but having a relationship to the businesses represented in the fund. Therefore, a rise in the index for the industry or industries, or their sectors, causes a corresponding rise in the payments to be made by the companies 210. A corresponding arrangement for payments to decrease in response to a lower than expected index could also be accommodated. In any event, a rise in the companies' payments causes a corresponding rise in the value of the fund, and thus the fund's shares.

The fund manager 220 may also receive a subset of SBLS shares 232', indicated by arrow 224. The subset of shares 232' is determined by allocating a number of shares to a company (e.g., company B1) based on that company's buy-in and then applying left over amounts from the buy-in to purchase shares 232' for the fund manager 220. The SBLS fund's investors 240 purchase shares 232 from the fund 230, e.g., publicly through an exchange 250 or privately. Again, some or all of these investors 240 may be the businesses 210 represented in the SBLS fund 230. The value of the fund, thus the values of the fund shares, is based on the payments made to the fund, along with other market factors, which is based on or related to the index 234. In lieu of, or in addition to, receiving shares 232', the fund manager may receive compensation in other forms, e.g., a portion of the payments made by companies 210.

Exemplary Structure of Arrangement Between an SBLS Companies and SBLS Fund

This example demonstrates the single sector SBLS fund, but those skilled in the art can easily extrapolate from this example to functioning in a multi-sector SBLS fund. Among the benefits to the SBLS companies (including, e.g., at least one small business) is up-front liquidity, as mentioned. Another benefit of the underlying structure of the relationship between the SBLS companies and the SBLS fund 130 is to allow the SBLS fund 130 to share in the financial performance of the business Sector A through payments by individual SBLS companies 110 in the chosen sector and enable fair and attractive tax treatment between the two entities, i.e., SBLS fund 130 and the SBLS companies 110 in the fund. In the hybrid or multi-sector SBLS fund, these benefits may be applied to several sectors represented within a single hybrid SBLS fund.

To accomplish these goals, the structure may be debt with some equity-like aspects or it could be all equity, in accor dance with various embodiments of the invention. One exemplary structure is:
   Proportion of Business: up to 20%
   Basic Structure: Equity
   Payments: Quarterly payment, floats with profits from business sector
   Form of Payment to Business Owners: Cash, or stock in the SBLS fund 130
   Criteria for Accepting SBLS companies into the SBLS Fund 130 may include, as examples:
      1) Verification of correct industry sector
      2) Existence of bank loans, or other debt
      3) Credit history or worthiness
      4) Existence and aging of receivables
      5) Personnel issues
      6) Availability of collateral
      7) Availability of personal guarantees
      8) Investor, partner, or other business relationships effecting likelihood of success of SBLS company As an example, a new SBLS fund 130 may be formed of SBLS companies 110 that are in the business of delivering home heating oil. Therefore, Sector A represents the home heating oil sector. Individual companies can be approached by commercial banks that make an introduction to the fund managers with whom they do business. The companies are screened and the selected SBLS companies 110 are offered the opportunity to receive SBLS fund shares 132 in return for paying in up to 20% of their current profits, indexed to a home heating oil delivery company earnings index 134.

For example, if a particular company A1 earns $1 million per year, it could begin by committing to pay in $200,000 per year, see arrow 112. A buy-in ratio is initially set by the fund creator/manager 120 to 15, so A1's payment is deemed to be worth $3 million in shares at market value. In this example, each share 132 in the SBLS fund 130 is initially set to earn $1 per year and the expected trading price of the shares is $20, because the PE is expected to be 20. The PE ratio (e.g., 20), earning per share (e.g., $1), and buy-in ratio (e.g., 15) are all determined initially. As with other securities, the PE ratio and earnings per share are subject to ongoing change. Additionally, it is not necessary that all shares are issued to an SBLS company at buy-in; the number of shares could be allowed to float with the performance of the SBLS fund 120.

The earnings per share is a relatively arbitrary figure that need not have any relationship to the sector. Although, the PE ratio may be based on historical performance of the given sector, e.g., a PE of 20 may be about the average for companies in the sector. The buy-in ratio is set by the SBLS fund manager 120 to provide an attractive opportunity to the SBLS companies, while also making the opportunity attractive for the SBLS fund manager 120.

In this exemplary scenario, therefore, the SBLS company A1 would receive 150,000 shares, e.g., $3M/$20 per share. In this embodiment, this follows the general equation:

(PAYMENT×BI RATIO)/PE=# SHARES TO COMPANY ($200k×15)/20=150k shares

However, the $200,000 buy-in paid by SBLS company A1 enables the creation of a total of 200,000 shares, each with earnings initially set at $1. Therefore, there are an additional 50,000 shares, determined by the equation:

(PAYMENT/SHARE EARNING)−# SHARES TO COMPANY=# SHARES TO FUND MGR

[$200K/($1/share)]−150,000 shares=50k shares

These extra 50,000 shares 132' can be profits to the manager of the SBLS fund 120, indicated by arrow 124.

Variations on the above approach may also be accommodated. The myriad variations possible include adjusting any of the structure parameters used in the example above, as would be appreciated by those skilled in the investment or financial arts. For example, some possible variations include:

1) The index 134 can be made a function of the revenues of a set of businesses or on business profits within a certain geographical area.
2) The payment by the SBLS companies 110 to the SBLS fund 120 could vary by each SBLS companies's revenues or some kind of standardized profits paradigm. For example, the formula could increase buy-in payments to the SBLS fund pay-ins by SBLS companies over time to increase fund value.
3) The SBLS companies need not be concentrated solely in one industry, but additionally, or alternatively, could be chosen or classified by geography or size or some other classification.
4) Represent in the SBLS fund not just businesses, but other types of entities, such as professional practices or even individual incomes and then make the index a function of the profession e.g. dentists, baseball players, musicians, actors, CEOs.
5) As mentioned above, as a form of hybrid SBLS fund, a diverse set of businesses may be grouped to form a more balanced fund, potentially reducing industry related risk.
6) The index 134 could be any type relevant index, composite index (e.g., S&P 500, Dow Jones Industrial Average, Nikkei) or combination of indices or other economic parameters or indicators (e.g., interest rates).
7) Interest payments and/or dividend payments could be made based on periodic criteria, event driven criteria (or stimuli), including threshold criteria, or some combination thereof.
8) The SBLS fund could represent, at least in part, bundles of receivables (e.g., present, future or a combination thereof), contract proceeds, or marketable rights (e.g., present, future or a combination thereof).

An example of adjusted criteria is as follows:
1) Proportion of Business: up to 20%
2) Basic Structure: Equity
3) Payments: Quarterly payment, floats with profits from business sector Computer Architecture A common index securities (or SBLS) system may be embodied in a network of computer systems and/or devices, which exchange information and data over one or more networks. The SBLS system requires that one or more of such computer systems and/or devices be specially configured and interconnected to achieve the various functions, transformations, communications, and technical relationships required to achieve a common index securities (or SBLS) system and method in accordance with aspects of the present invention.

Figure 3:
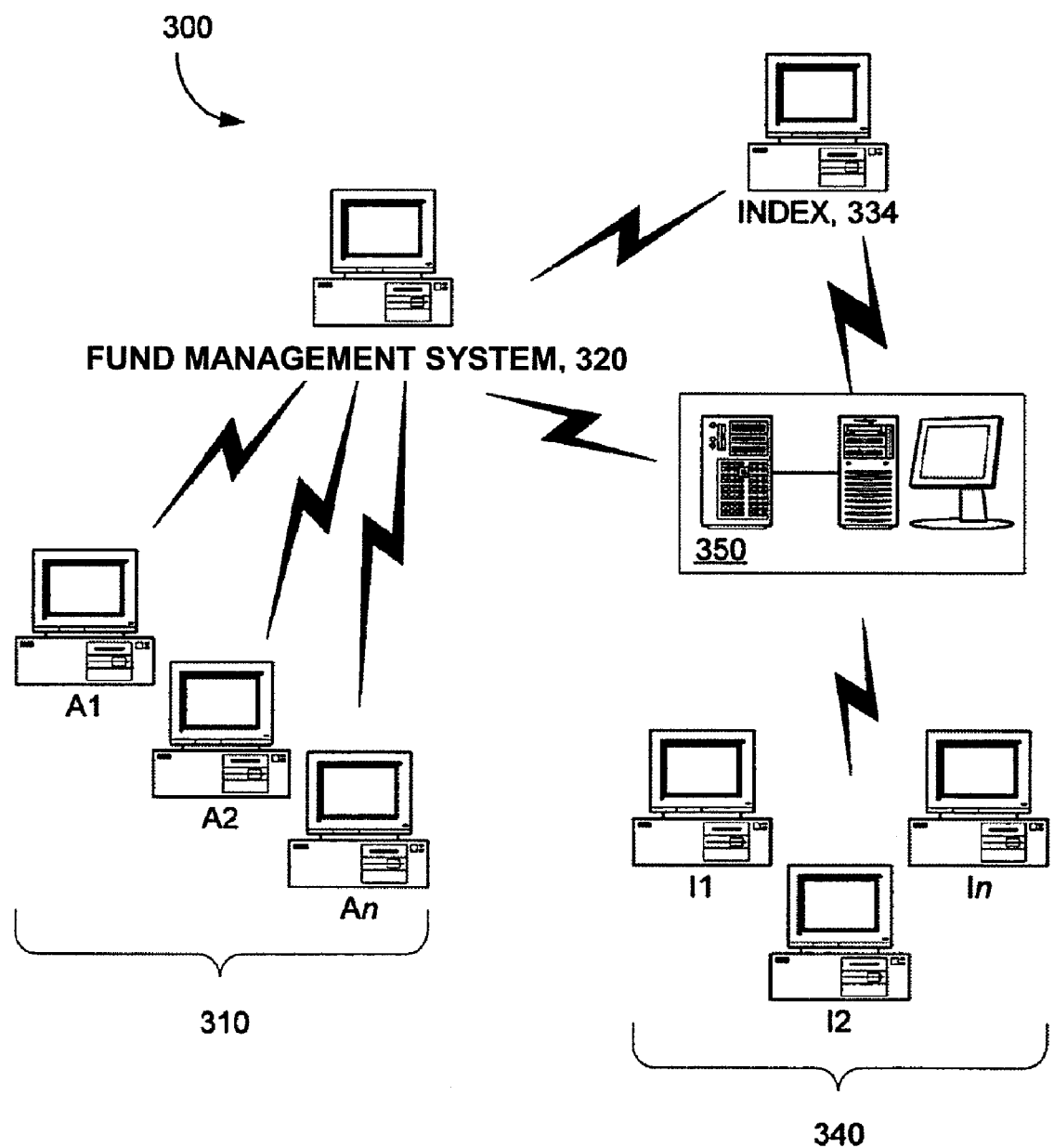
FIG. 3 is a top level embodiment of a computer architecture which could be used to implement the systems of FIG. 1 and FIG. 2

FIG. 3 provides one possible architecture 300 for implementing a common index securities (or a SBLS) system and method, referred to herein as an SBLS system 300. For example, the various blocks in FIGS. 1 and 2 may represent such systems and devices, which have been specially configured and interconnected to achieve the relationships and functions described above. SBLS fund manager 120 represents a fund management system 320 that is specially configured to exchange information with other systems, e.g., to receive index 134 from index system 334, to communicate share information with an exchange system 350, and to provide fund information to SBLS company systems 310 and investor systems 340. Fund management system 320 is also specially configured to create and maintain accounts with the SBLS companies 110 relating to, for example, payment of the upfront liquidity, payment calculations and adjustment, and account balance calculations.

In this case, fund management system 320 provides the overall administration of the SBLS fund 130, which may include creating the SBLS fund 130 and establishing all of the relevant parameters and selection of the SBLS companies A1, A2, . . . An and interaction with their associated systems 310, processing the buy-ins and distributions with the SBLS companies 110, and interaction with exchange system 350 for offering, trading, and redeeming the SBLS shares 132, if required. Investors I1, I2, . . . In 140, using investor systems 340, may access the exchange system 350 for the trading and redeeming of shares 132. The SBLS companies 110 represented in the SBLS fund 130 may also be considered investors. At least one of the fund management system 320 or exchange system 350 can communicate with index systems 334 to obtain the index 134 or information useful for generating the index 134. The fund management system 320 can adjust the value of the payments by SBLS companies 110 using the index 134. The value of the SBLS fund 130 can also be adjusted accordingly, in response to changes in the index 134.

The actual platforms used in the SBLS system 300 can include main frame computers, Web and application servers, personal computers, workstations, personal digital assistants (PDAs), cell phones, pagers, e-mail devices, and other handheld devices, and so on. Any of the foregoing may output information by computer display, printer, electronic communication, and so on. Any of the foregoing may receive information via keyboard, scanner, electronic communication, and so on. As examples, handheld devices may be used to collect or input data and/or to calculate the indexes, and optical character reader (OCR) devices and/or special scanners may be used to collect or input data.

Within the SBLS system 300, the various platforms, devices, and/or subsystems may process, store, operate on, present, or communicate SBLS related data and execute SBLS functionality. Communications among the foregoing may be by wired or wireless communications systems or subsystems, or some combination thereof. Data may be pushed to or pulled from the various systems and subsystem described herein. Networks can include local area networks, wide area networks, virtual private networks, the Internet, the Web, or any other known or later developed network, or combination thereof.

Functionality of the systems, subsystems and modules described herein may be embodied in software, hardware, firmware, or some combination thereof. To the extent functionality is embodied in software, it may be embodied in program code stored in memory and executed by one or more processors. The program code and related data may be stored in any known form of computer storage device or system. The functionality and data may be co-located or distributed among a plurality of systems, subsystems, and/or modules.

Exemplary Embodiment Of An Indexed Payment Stream System And Method

In accordance with another aspect of the invention, there is provided a system and method for creation and management of a common index securities (or SBLS) fund that borrows money from a lender (or investor(s)) and loans it out to borrowers (e.g., small businesses, such as individuals). The monies loaned to the borrowers are deposited in an interest-bearing account (or vehicle, e.g., a CD). A portion of the interest goes back to the lender and a portion of the interest goes to the borrower and/or another party on behalf of the borrower. The principal loan is paid back to the lender, and the borrower pays an amount indexed to accumulated in interest-bearing account to the lender. A portion of the interest could also go to the fund. After termination of the interest-bearing account, e.g., repayment or withdrawal of the deposited loan amount, the principal is paid back to the lender and the borrower pays the fund an amount indexed to the fortunes of the borrower.

Figure 4:
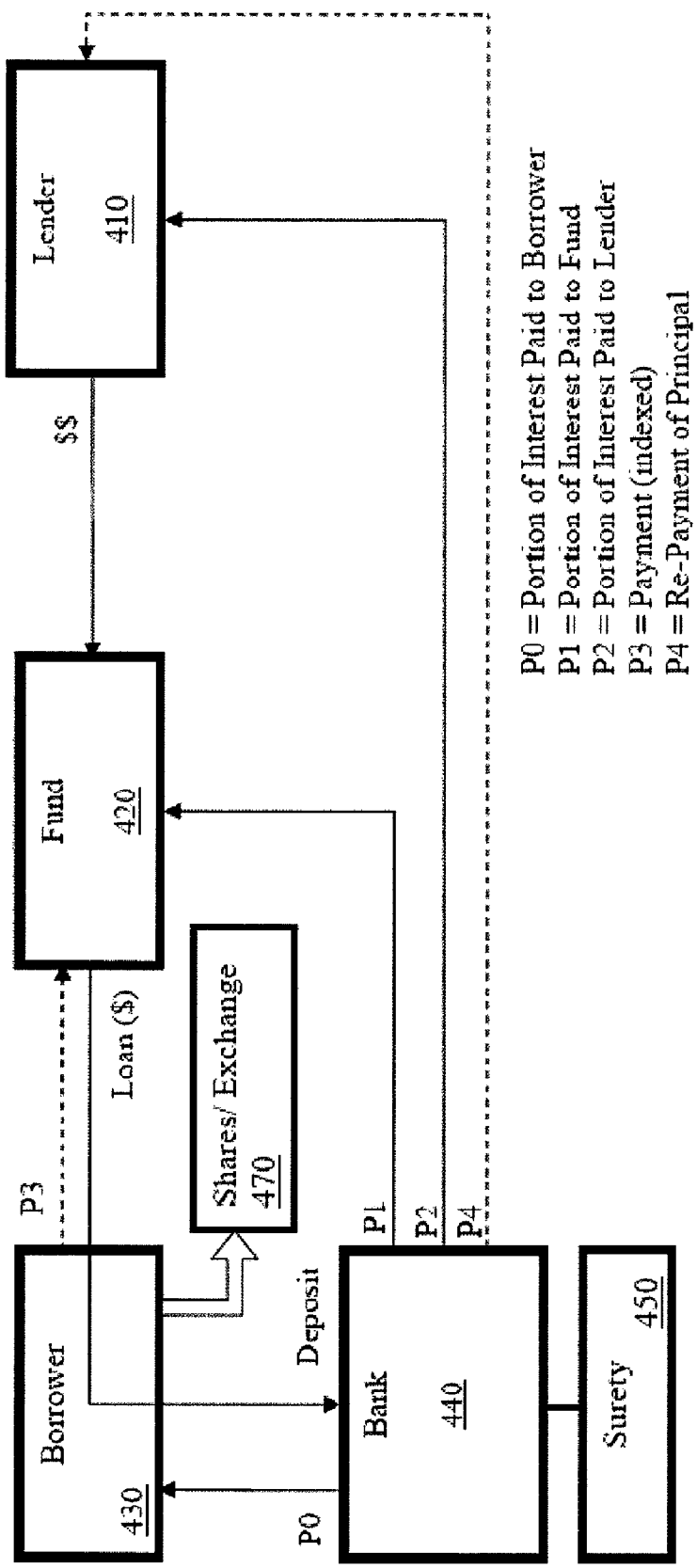
FIG. 4 provides a block diagram showing cash flows between entities in an embodiment of a common index fund.

FIG. 4 shows a block diagram of cash flows between entities that could be used to implement this kind of fund. The entities in FIG. 4 serve certain roles with respect to the fund, e.g., lender, borrower, etc. In other embodiments, one entity could perform multiple roles, such as the bank and the lender, as an example. Each entity in FIG. 4 is representative of a system that includes computer elements that perform the various functions described herein.

In this embodiment, a Lender 410 provides cash to a Fund 420, indicated as "$$." Fund 420, in-turn, makes loans to various Borrowers 430, indicated as "Loan ($)." In this embodiment, the principal loan amount for each Borrower 430 is deposited in an interest-bearing account, e.g., used to purchase a CD at a Bank 440, as demonstrated by the line marked "Loan ($)" that passes through the Borrower 430 to Bank 440. The principal could pass directly from the Fund 420 to the Bank 440 on behalf of the Borrower 430 or the principal could pass directly from the Lender 410 to the Bank 440 on behalf of the Borrower 430 or Fund 420, under management of the Fund 420.

The Bank 440 with which the principal is deposited can be the Lender 410 in some embodiments, despite that the two are shown as separate entities in FIG. 4. This could reduce risk for the Lender 410. However, the Bank 440 and Lender 410 do not need to be the same entity in all embodiments. And, in some embodiments, the Fund 420 can take cash from more than one Lender 410 and different Borrowers 430 could deposit their respective principal loan amounts in different Banks 440, or in the same Bank 440.

In some embodiments, the interest-bearing accounts can be backed by a surety or guarantor, referred to as "Surety" 450 in FIG. 4. For instance, the interest-bearing account can be an FDIC insured account backed by the U.S. Government. This way, big lenders can get the benefit of the FDIC insurance and the higher yield of a bank account, as compared to a U.S. Treasury note, while still getting an investment backed by the full faith and credit of the U.S. Government. In other embodiments, a Surety 450 need no be included for one or more of the interest-bearing accounts.

In this embodiment, there are three phases. A first phase begins when the Borrower 430 gets a loan and the principal is deposited in the interest-bearing account at Bank 440. The first phase ends when the interest-bearing account begins to earn and payout interest. The second phase ends and the third phase begins when the principal is paid back to the Lender 410 or otherwise withdrawn from bank 440. In the third phase, the Borrower 430 and Fund 420 remain, with the Borrower 430 making indexed payments to the Fund 420.

During the second phase, while the money is in the interest-bearing account with Bank 440, the interest generated from that account is distributed. Some of the interest goes to the Lender 410 (as P2) and some of the interest goes to the Borrower 430 (as P0) and/or to a third party to address a debt obligation of the Borrower, e.g., a credit card company. Some of the interest can also go to the Fund 420 (as P1).

Banks typically lend to each other at a standard rate, e.g., LIBOR. The interest P2 that is paid to Lender 410 can be set at that standard rate in the preferred embodiment. However, in other embodiments a different rate could be set. The rate of the interest-bearing account at Bank 440 is greater than the standard rate paid to the Lender 410. Therefore, the interest earned by the interest-bearing account is greater than the interest payment P2 paid to the Lender 410.

As an example, if LIBOR is 0.40% and the interest-bearing account is a CD paying 2.75%, the Lender 410 can be paid 0.40% (P2), the Borrower 430 can receive 1.75% (P0), and the Fund 420 can receive 0.60% (P1) in the second phase.

These three interest cash flows P0-P2 could be paid directly by the Bank 440 to each party, go through Fund 420, or go through the Lender 410. If the Borrower 430 uses some or all of its interest to pay its debt with a third party, then its payments can be made directly to the third party. In the preferred embodiment, one or more of these payments are made electronically.

The third phase is commenced when the principal in the bank account is withdrawn. At this time, the principal can be repaid to the Lender 410, indicated by dashed line P4. But in other embodiments, the Fund 420 could re-loan the money to a new Borrower 430 or the same Borrower 430.

In the third phase, Borrower 430 pays the Fund 420 one or more indexed payments—as a payment stream. The index can be chosen based on the types of entities (or small businesses) that serve as Borrowers 430, so long as it provides some measure of their fortunes, e.g., revenue, equity, or value generating ability of Borrowers 430. For example, for home owners, residential rental rates could suffice as an index—as a measure of their fortunes. In such a case, the Borrower 430 could pay the Fund an amount indexed to rents in its area for a 10 year term. The payments can be adjusted in accordance with the index during the term of the payment stream obligation.

Those skilled in the art will appreciate that the cash flows shown in FIG. 4 are provided for the purposes of illustrating aspects of the invention, and should not be construed as explicit limitations of the invention. Where a cash flow is shown going directly from one box to another box in FIG. 4, in other embodiments there could be an intermediary or alternate routing. And where cash flow is shown as having an intermediary in FIG. 4, in other embodiments the cash flow might not use the intermediary. For example, the Loan($) in FIG. 4 could flow directly from Fund 420 to the Bank 440, on behalf of the Borrower 430, without the Borrower 430 being an intermediary. As another example, where the Borrower's interest P0 is shown going directly to the Borrower 430 in FIG. 4, P0 could go directly to a creditor of the Borrower 430, e.g., the Borrower's mortgage company. Those skilled in the art will appreciate that other permutations could exist without departing from the spirit and scope of the present invention.

Those skilled in the art will also appreciate that other parties could be involved in the cash flows. Such other parties could act on behalf of one or more of the entities depicted in FIG. 4, e.g., as intermediaries, agents, debt collectors, or service providers involved in facilitating the cash flows. FIG. 4 has been presented in a relatively simple and straightforward manner to aid in conveying principles of the invention, but not to limit the scope of the invention.

As discussed above with respect to FIGS. 1 & 2, shares can be issued against the Fund 420, and those shares can be publicly or privately traded, or not traded, as indicated by Shares/Exchange 470 in FIG. 4.

Also as discussed above, each of Lender 410, Fund 420, and Bank 440 represent computer systems that interact via various forms of communication and networks. Borrower 430 can also be a computer system, e.g., a personal computer of a home owner (Borrower), or a system of a third party credit card company or bank of the Borrower. In particular, Fund 420 can be a computer system that manages, maintains, organizes, and transforms information related to the Fund, including storing and tracking cash in-flows and out-flows, payment obligations of Borrowers, indexed adjustments of payments streams, evaluation and performance of the Fund, account set-up and maintenance for entities related to the Fund, and communication and interaction with third party systems to accomplish the foregoing.

Figure 5:
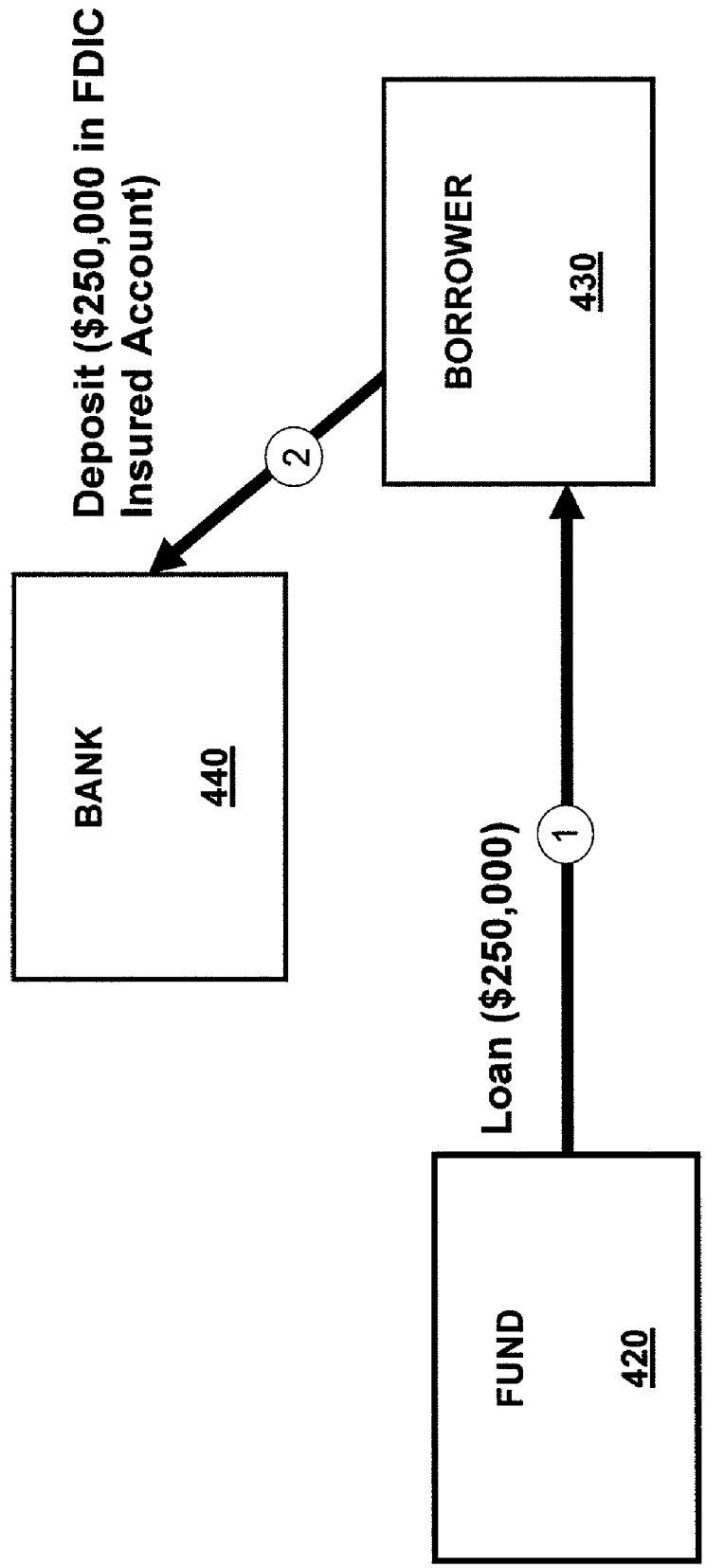
Figure 6:
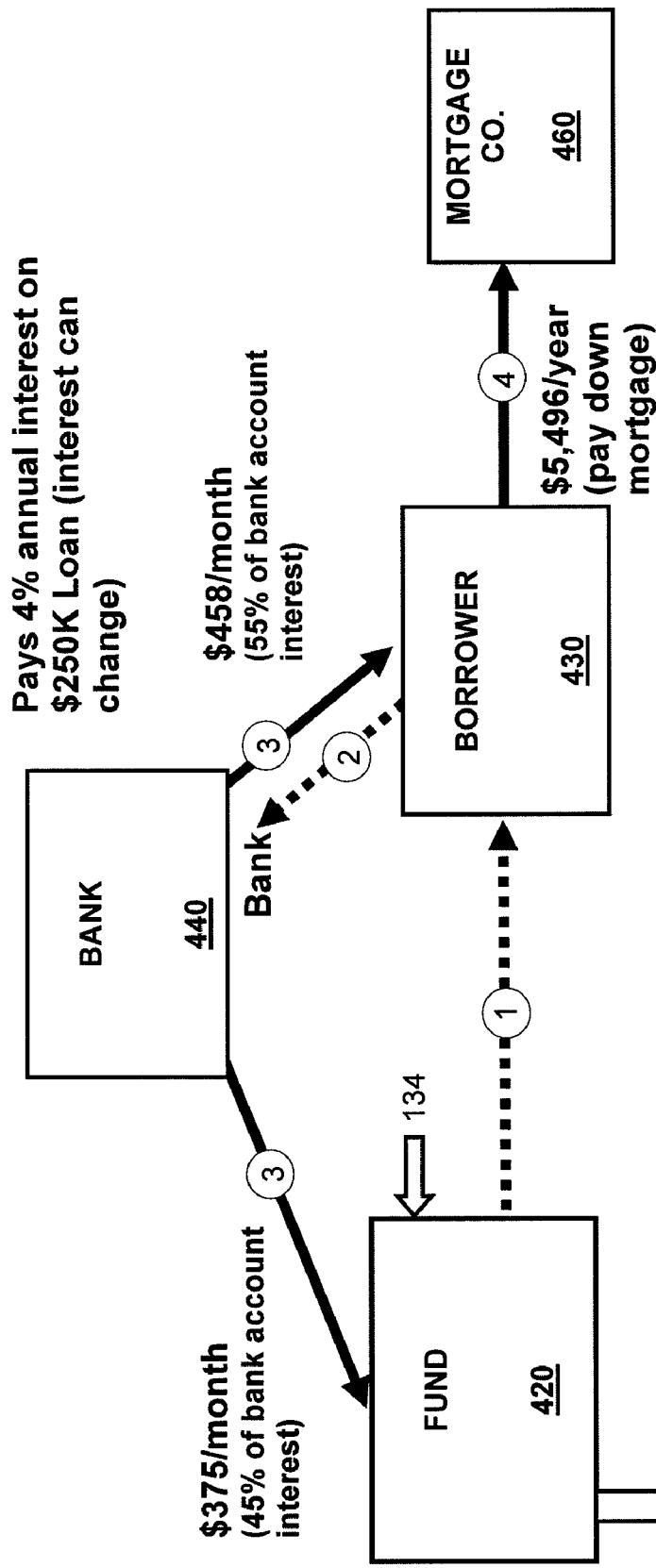
Figure 7:
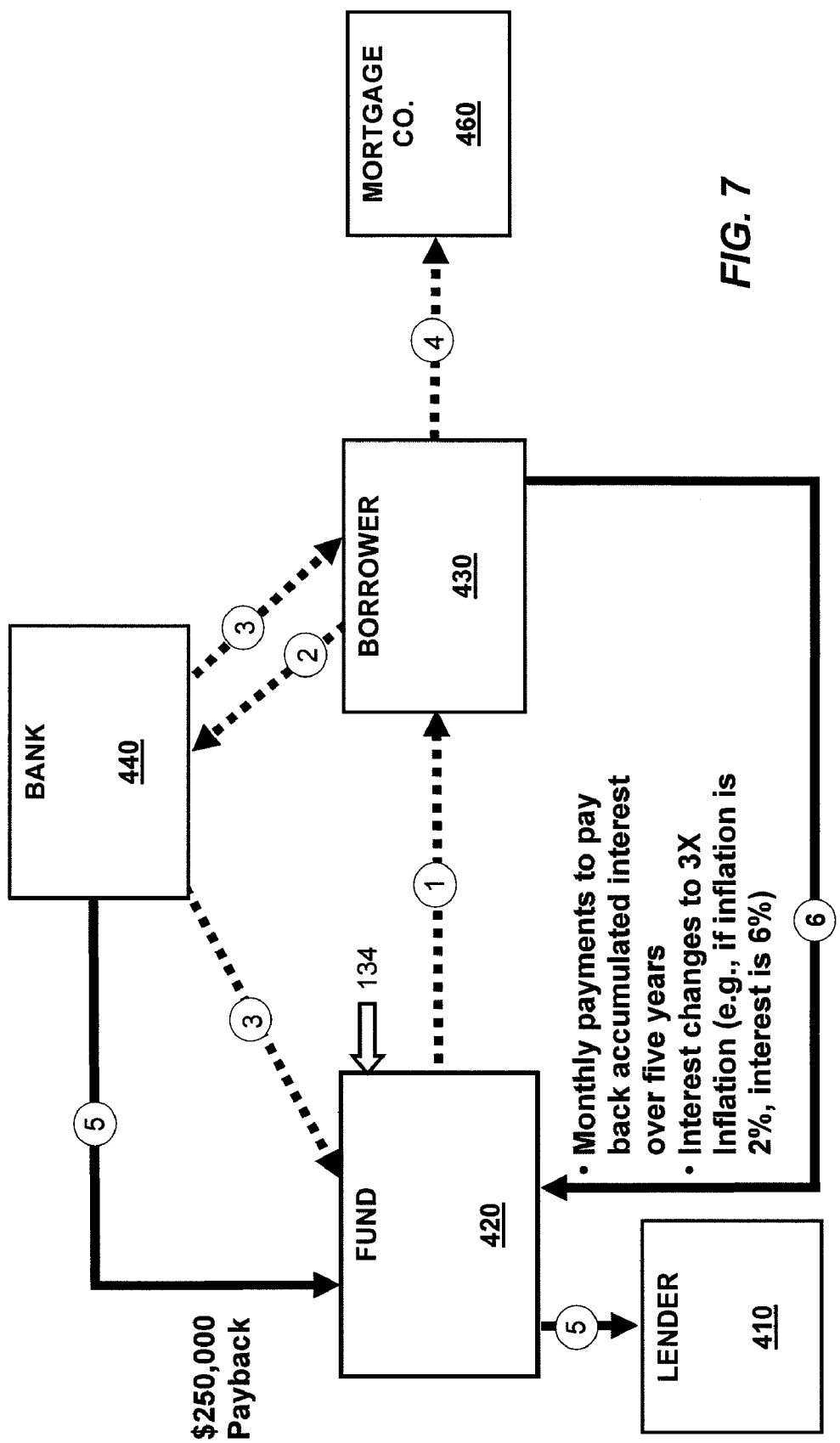

FIGS. 5-9 show a more detailed example embodiment of the system and method of FIG. 4. In particular, FIGS. 5-7 depict the three phases discussed above with respect to FIG. 4. FIG. 5 depicts phase I, the loan phase. In FIG. 5, the Borrower 430 receives a $250,000 Loan from the Fund 420, indicated by step 1. The Loan comes from Lender 410 of FIG. 4, in this embodiment. In step 2, the Loan is deposited in the Bank 440, preferably in an FDIC insured interest-bearing account.

In FIG. 6 and thereafter, the previously performed steps are indicated by dashed lines. In phase II, the $250,000 account in Bank 440 generates interest payments from Bank 440. The Bank 440 is presumed to pay 4% on the $250K deposit. In step 3, 55% of the interest earned is paid to Borrower 430 (P0), which amounts to $458 per month or $5,496 per year. Here, the interest is it used to pay down the Borrower's mortgage, as shown by step 4 with the electronic transfer to Mortgage Co. 460. But in other embodiments, the interest income could be used by the Borrower 430 to pay other debts, or could be saved or invested. The Fund 420 receives 45% of the interest from the Bank 440 (P1+P2), which is $375 per month in this embodiment, also shown as step 3. The Fund 420 can then pay the Lender 410, e.g., LIBOR, to satisfy the obligations to the Lender (P2). Therefore, Lender 410, Fund 420, and Borrower 430 each benefit from the interest earned on the deposited principal amount of $250K.

Additionally, in this embodiment there is interest on the loan charged to the Borrower 430 by the Fund 420, referred as accumulated interest that is not paid back until phase III. In this embodiment, the accumulated interest is determined based on the principal loan amount and an index, Index 134, including at least a component that has value-based relationship to the entity, or a class to which the entity belongs. In this example, the Borrower 430 is a home owner in the Boston, Mass. metro area and the index is chosen to be 1× Boston Metro Rent Inflation. The Boston Metro Rent Inflation is known to be 2.2%, according to this example. Other multiples of Boston Metro Rent Inflation could be chosen for the index, in which case Boston Metro Rent Inflation would be considered a base index and the chosen multiple would be considered an effective index. In other embodiment, Boston Metro Rent Inflation could only be a component of a composite index. In this embodiment, the accumulated interest is determined for a period of time the loan to Borrower is considered to be outstanding, which is a time period that is not more than the loan term—i.e., the loan could be terminated before the end of the term. The accumulated interest could be calculated during phase II, or retrospectively during phase III.

In FIG. 7, phase III is depicted, where the $250K loan has been paid back to the Fund 420, in step 5—which terminates the loan with respect to the Borrower 430. The Fund 420 can repay the loan to the Lender 410 (as an optional extension of step 5), or re-loan some or all of it to another Borrower or the same Borrower. From that point forward, for a payment term of 5 years, in this embodiment, the Borrower 430 makes monthly payments to pay off the accumulated interest from the Loan. The accumulated interest payments are determined or adjusted using a relevant index, for the term of 5 years. In this embodiment, the index (Index 134) is chosen to be three time (3×) Boston Metro Rent Inflation, which is presumed to be 2.0% in this example. In such a case, Boston Metro Rent Inflation can be referred to as a base index and the effective index is a multiple greater than 1 (here 3) of the base index for payment of the accumulated interest.

FIGS. 8 and 9 provide tables that show the various parameters and calculations for this embodiment. In FIG. 8 the apportionment of the interest from the interest-bearing account is shown, where 4.0% interest is earned. Fund 420 receives 45% of the earned interest ($375) and the Borrower receives 55% of the earned interest ($458). The Lender 410 receives a first portion of that earned interest, via the payment from Fund 429, and the Borrower 430 receives a second portion of the interest. Fund 420 can retain anything left over after it pays Lender 410, as a third portion of the earned interest.

In FIGS. 8 and 9 note that the sooner the $250K loan is paid back (or terminated), the less the accumulated interest and the lower the Borrower's 430 monthly payments thereafter to the Fund 420. For example, in FIGS. 8 and 9, if the Borrower 430 pays back the $250K at the end of the first year (2009), the accumulated interest will be $5,500 and the Borrower's monthly payments, in FIG. 9, will be $106/month for 5 years. But if the Borrower repays the $250K at the end of year 8 (2016), the accumulated interest will be $43,489 and the Borrower's monthly payments, in FIG. 9, will be $841/month for 5 years.

In accordance with various aspects of the present invention, a common index securities (or SBLS) system defines a fund in memory as an entity, in an entity or Fund identification (ID) field. Certain data fields are created in memory in association with the Fund ID, and are used for storage and organization of information and data necessary and/or useful in electronically creating, managing, processing transactions, and interacting with Fund 420.

Figure 10:
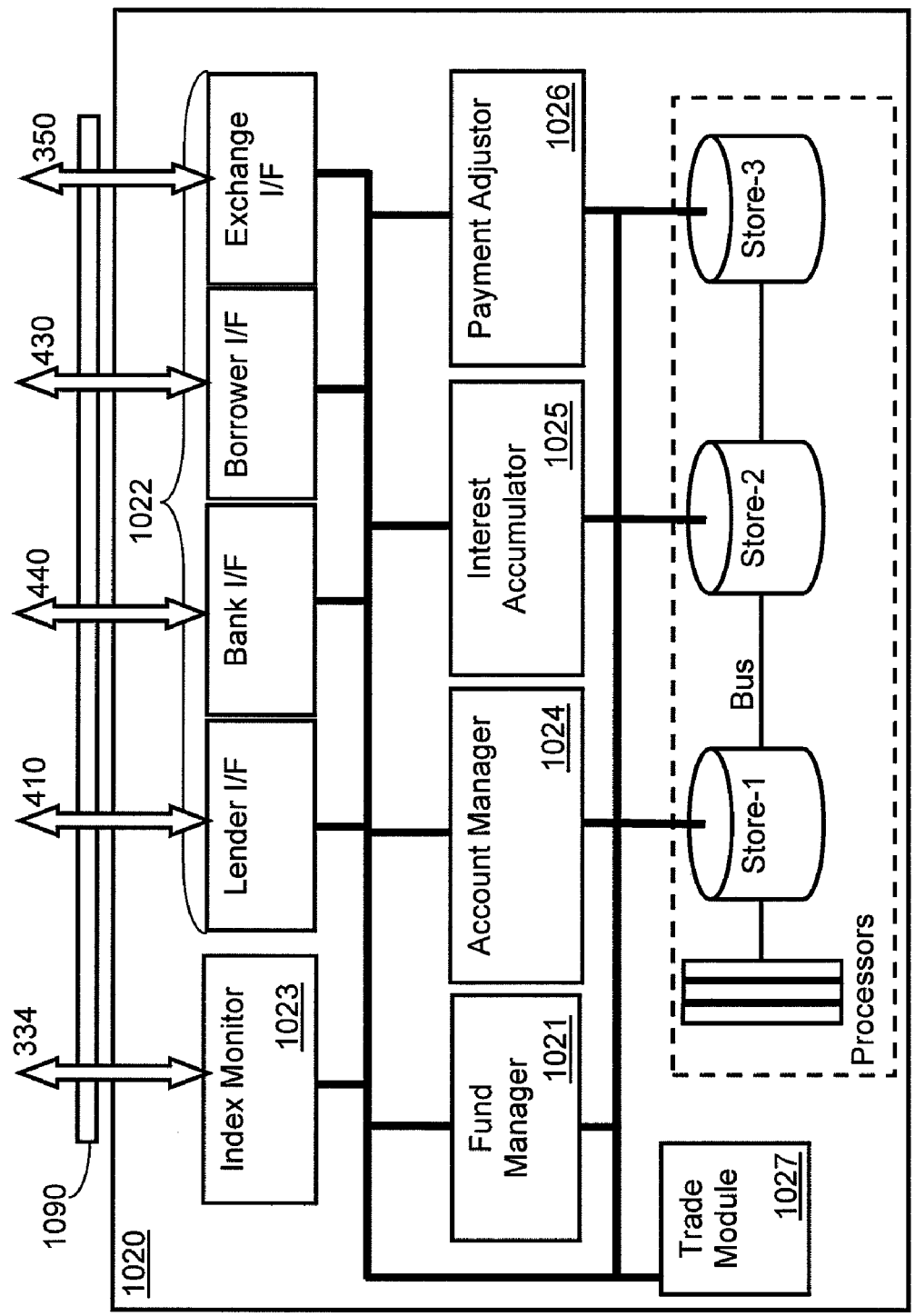
FIG. 10 is a block diagram of an embodiment of a fund computer system, in accordance with aspects of the present invention.

FIG. 10 is a block diagram of an embodiment of a fund management system 1020, in accordance with aspects of the present invention. In particular, fund management system 1020 can be a computer system that implements the Fund 420 in FIGS. 4-9. Also, fund management system 320 of FIG. 3 can take the form of fund management system 1020 in FIG. 10. As will be appreciated by those skilled in the computer arts, fund management system 1020 can take a variety of technical forms.

Various functional modules are shown in FIG. 10, and these modules may take the form of hardware, firmware, software, or some combination thereof, where computer program code can be stored in a storage medium and executed by at least one processor to implement functions described herein, as discussed above with respect to FIG. 3. For example, in FIG. 10 hardware is depicted by "Processors" and Store-1, 2, 3, which can be connected by a Bus. As will be appreciated by those skilled in the art, the Processors and storage devices may be collocated, remote to each other, or some combination thereof.

In FIG. 10, a Fund Manager 1021 performs the overall management of the Fund 420 and fund management system 1020. For example, Fund Manager 1021 may be used to define Fund 420 in Store-1, which can include storing a fund name or identification in a Fund ID field of Store-1. In some embodiments, Fund Manager 1021 may be used to create and manage multiple funds, which may all be independent of each other. In association with a Fund ID, one or more cash accounts can also be defined—which can collectively define a pool of cash available for lending by the Fund 420.

Also in association with the Fund ID, a set of Borrowers 430 can be defined in memory, such as Store-1. For each Borrower, an account can be defined and managed by Account Manager 1024. The account definition is linked to the Fund ID, and can include the name of the Borrower (or other identifying information), a principal amount, a loan date, a loan term, and a payment term, as examples. FIG. 11 provides an example of information that can be stored in an account definition for a Borrower 430.

In FIG. 11, the Fund 420 name is Boston Metro 2010, and borrower Joe Smith (Borrower 430) has been issued an account number 2010-001. The Lender 410 is identified as Merrill Lynch and the Bank 440 is identified as Citibank. The principal amount is $250,000, which is provided to Bank 440 on behalf of Joe Smith. The loan term is 10 years, which commences on Jan. 15, 2010 and is scheduled to end on Jan. 15, 2020. The accumulated interest is yet to be calculated, and the payment term is set to 5 years. The payment term start date is defaulted to the loan end date and the payment end date is defaulted to 5 years from that start date. The payment term start and end dates will be updated if the loan end date is different that the planned end date of Jan. 15, 2020, and in any event will begin when the loan is terminated with respect to Borrower 430, e.g., when the principal is withdrawn from Bank 440 and/or paid to Lender 410. At such time, the accumulated interest amount, monthly payment and payment term start and end dates will be finally determined by the fund management system 1020. Each of these types of information can have a data field and value stored in Store-1, using Account Manager 1021, for example.

Therefore, under the management of fund management system 1020, Borrower 430 receives upfront liquidity in the form of interest payments made by the Bank 440, as described for phase II, which is in exchange for subsequent consideration back to the Fund 420 in the form of one or more indexed payments made to the Fund 420 to pay off the accumulated interest.

An Interest Accumulator 1025 tracks and calculates the accumulated interest for each account, which it can store in Store-2 for subsequent use by Account Manager 1024, or the Interest Accumulator 1025 can pass the accumulated interest value to Account Manager 1024 for storage in Store-1. Interest Accumulator 1025 can operate in coordination with Fund Manager 1021.

A Payment Adjustor 1026 determines the payment adjustments to be made for each account, based on the relevant index, which it can store in Store-3 for subsequent use by Account Manager 1024, or the Payment Adjustor 1026 can pass the adjusted payment amounts to Account Manager 424 for storage in Store-1. Payment Adjustor 1026 can operate in coordination with Fund Manager 1021.

Fund management system 1020 can also include an Index Monitor 1023 that obtains the Index 134 or index information used to generate Index 134 from external sources, such as an index system 334. Therefore, Index Monitor 1023 can be configured to query external systems to request and/or retrieve the Index 134 or index information used to generate Index 134. The Index Monitor 1023 can, therefore, be configured to generate an index for Fund 420, and store it in any one or more of Stores-1, 2, or 3. For instance, Index Monitor 1023 can obtain or generate a base index and determine an effective index for use in determining the accumulated interest and/or the borrowers' payments for paying off the accumulated interest. Index Monitor could generate a composite index from information, data, and/or components received from external sources.

Fund management system 1020 can include a set of interfaces (I/F) 1022 useful for interacting with external systems and sources. Lender I/F can be used to enable or facilitate interaction with Lender 410 (and systems thereof), e.g., for managing or arranging the flow of cash to Bank 440, repayment of the principal to Lender 410 (P4), and/or payment of interest (P2) from the Bank 440 to Lender 410 or from Fund 420 to Lender 410.

Bank I/F can be used to enable or facilitate interaction with Bank 440 (and systems thereof), e.g., for managing or arranging the deposit of the principal from Lender 410 or Fund 420 to Bank 440, payment of interest to Borrower 430 (P0), Fund 420 (P1), and/or Lender 410, and/or the repayment of the principal from Bank 440 or Fund 420 to Lender 410.

Borrower I/F can be used to enable or facilitate interaction with one or more Borrower 440 (and systems thereof), e.g., for managing or arranging the account interaction with Borrower 430, deposit of the principal from the Lender 410 or Fund 420 to the Bank 440 on behalf of Borrower 430; payment of interest to Borrower 430 (P0) or its designee, and/or the payment of the indexed accumulated interest from Borrower 430 to Fund 420.

Exchange I/F can be used to enable or facilitate interaction with an Exchange 350 (and systems thereof), e.g., for enabling or facilitating making shares available for trading, tracking performance of shares, adjusting the value of shares, and/or processing associated with issuance and/or redemption of shares. With respect to the shares, fund management system 1020 may include a Trade Module 1027 for performing, enabling, or facilitating any one or more of the foregoing functions.

The various modules that communicate with external systems may do so via any of a variety of networks using any of a variety of communication types, devices, and systems, collectively represented as block 1090 in FIG. 10. Such communication types, networks, devices, and systems are described with respect to FIG. 3, and are generally known, so not described herein. The present invention is not limited to any particular types of communication types, networks, devices, and systems, but fund management system 1020 preferably uses the foregoing to interact and exchange information with external systems, via at least the Internet and Web, for example.

While the foregoing has described what are considered to be the best mode and/or other preferred embodiments, it is understood that various modifications can be made therein and that the invention or inventions may be implemented in various forms and embodiments, and that they may be applied in numerous applications, only some of which have been described herein. It is intended by the following claims to claim that which is literally described and all equivalents thereto, including all modifications and variations that fall within the scope of each claim.

What is claimed is:

1. A computer-implemented method for providing a fund that provides liquidity in a plurality of borrowers in a defined class, the method comprising:
    providing a computer system having a computer processor coupled to a data storage device, the computer system configured to exchange data with external systems via a computer network;
    in the data storage device, defining a fund identification (ID) and a cash value representing a fund pool of cash from at least one lender;
    generating a loan from the fund pool of cash to a borrower from the plurality of borrowers in relation to an asset of the borrower, including storing in the data storage device a loan principal and loan term in association with the borrower;

depositing the loan principal in an interest-bearing account and electronically calculating interest;

for a time period not greater than the loan term, electronically proportioning the interest and distributing a first interest portion to a lender account and a second interest portion to a borrower account;

electronically calculating an accumulated interest amount for the loan for the time period based on the loan principal; and calculating a payment stream for the borrower from the accumulated interest amount and from an index that represents value-based performance of the class, wherein the class represents a market to which the asset of the borrower belongs.

2. The method of claim 1, further comprising:

processing a borrower payment from the payment stream by transforming digital accumulated interest payment information into an electronic payment value and reducing the accumulated interest amount by the payment value.

3. The method of claim 1, further comprising:

calculating the accumulated interest amount using the index.

4. The method of claim 1, wherein the class includes residential real estate and the plurality of borrowers includes individual home owners.

5. The method of claim 4, wherein the index includes a component representing residential rental rates.

6. The method of claim 1, further comprising:

electronically generating the index from data received via the network from at least one external source.

7. The method of claim 1, wherein the index is an effective index that is a multiple of a base index, wherein the multiple is greater than 1.

8. The method of claim 1, further comprising:

electronically issuing shares as claims against the fund.

9. The method of claim 8, further comprising:

offering at least some of the shares for trading via an exchange managed by a trading system.

10. The method of claim 1, further comprising:

electronically distributing a third portion of the interest to a fund account.

11. A fund management system configured to provide liquidity in a plurality of borrowers in a defined class, the system comprising:

at least one computer processor coupled to at least one data storage device, configured to exchange data with external systems via a computer network;

a fund manager adapted to store a fund identification (ID) and a cash value representing a fund pool of cash from at least one lender;

an account manager adapted to generate a loan from the fund pool of cash to a borrower from the plurality of borrowers in relation to an asset of the borrower, wherein the account manager stores a loan principal and loan term in association with the borrower;

the fund manager is also adapted to determine interest of an interest-bearing account into which the loan principal has been deposited;

the fund manager is also adapted to determine a proportioning of the interest, wherein, for a time period not greater than the loan term, a first interest portion is distributed to a lender account and a second interest portion is distributed to a borrower account;

an interest accumulator adapted to electronically calculate an accumulated interest amount for the loan for the time period based on the loan principal; and a payment adjuster adapted to calculate a payment stream for the borrower from the accumulated interest amount and from an index that represents value-based performance of the class, wherein the class represents a market to which the asset of the borrower belongs.

12. The system of claim 11, wherein:

the payment adjuster is also adapted to process a borrower payment from the payment stream by transforming digital accumulated interest payment information into an electronic payment value and reducing the accumulated interest amount by the payment value.

13. The system of claim 11, wherein:

the interest accumulator is also adapted to calculate the accumulated interest amount using the index.

14. The system of claim 11, wherein the class includes residential real estate and the plurality of borrowers includes individual home owners.

15. The system of claim 14, wherein the index includes a component representing residential rental rates.

16. The system of claim 11, further comprising:

an index monitor adapted to electronically generate the index from data received via the network from at least one external source.

17. The system of claim 16, wherein:

the index monitor is also adapted to generate the index as an effective index that is a multiple of a base index, wherein the multiple is greater than 1.

18. The system of claim 11, further comprising:

a trading module adapted to electronically issue shares as claims against the fund.

19. The system of claim 18, wherein:

the trade module is also adapted to electronically communicate with a trading system that offers at least some of the shares for trading via an exchange.

20. The system of claim 11, wherein:

the fund manager is also adapted to determine a third portion of the interest and to electronically distribute the third portion of the interest to a fund account.

21. A computer-implemented method for providing a fund that provides liquidity in a plurality of borrowers in a defined class, the method comprising:

providing a computer system having a computer processor coupled to at least one data storage device, the computer system configured to exchange data with external systems via a computer network; and using the computer system:

defining a fund having a cash value representing a fund pool of cash from at least one lender;

generating a loan from the fund pool of cash to a borrower from the plurality of borrowers in relation to an asset of the borrower, including defining a loan principal;

depositing the loan principal in an interest-bearing account;

proportioning interest from the interest-bearing account into a first interest portion for a lender and a second interest portion for the borrower;

calculating an accumulated interest amount for the loan based on the loan principal and a duration of the loan; and calculating a payment stream for the borrower from the accumulated interest amount and from an index that represents value-based performance of the class, wherein the class represents a market to which the asset of the borrower belongs.

22. The method of claim 21, further comprising:
calculating the accumulated interest amount using the index.

23. The method of claim 1, wherein the class includes residential real estate and the plurality of borrowers includes individual home owners.

24. The method of claim 23, wherein the index includes a component representing residential rental rates.

25. The method of claim 21, further comprising:
electronically generating the index from data received via the network from at least one external source.

26. The method of claim 21, wherein the index is an effective index that is a multiple of a base index, wherein the multiple is greater than 1.

27. The method of claim 21, further comprising:
issuing shares as claims against the fund.

28. The method of claim 27, further comprising:
offering at least some of the shares for electronic trading via an exchange managed by a trading system.

29. The method of claim 21, further comprising:
electronically distributing a third portion of the interest to a fund account.

* * * * *